Patented June 26, 1945

2,379,311

UNITED STATES PATENT OFFICE 2,379,311

METHOD OF MANUFACTURING CUT SEAMED ARTICLES

Frank S. Martin, Providence, R. I., assignor to United States Rubber Company, New York, N. Y., a corporation of New Jersey No Drawing. Application July 18, 1942, Serial No. 451,491

2 Claims. (Cl. 154—42)

This invention relates to an improved method of manufacturing cut seamed articles, whereby the tendency of the seam to part before the article is vulcanized in the case of rubber, and before it is subjected to a heat bonding action in the case of plasticized thermoplastic materials, is greatly reduced.

Heretofore in manufacturing cut seamed articles by cut-seaming unvulcanized sheets of rubber together considerable difficulty was experienced in manufacturing certain types of articles due to the tendency of the seam to part before it could be vulcanized.

For example in manufacturing certain types of mobile golf ball centers or rubber bulbs, by the so-called machine preforming method, two sheets of unvulcanized rubber stock are cut-seamed together so that they enclose, in many cases, a small amount of a blowing agent. The blanks thus formed are then put into a mold for curing, and the blowing agent when heated develops a gas pressure inside of the sphere or bulb that forces the stock out against the mold.

When, however, an appreciable period of time elapses between the preforming and vulcanizing operations the seam has a tendency to open up, due to the stress in the uncured rubber at the seam caused by the distortion of the rubber by the cut-seaming die and the tendency of the rubber to return to the original shape. This difficulty with poor seams may occur in many cut seaming operations in addition to those described in the above example and is very largely corrected by the following procedure which may be used in working with unvulcanized rubber or with plasticized thermoplastic materials.

I have found that this trouble caused by the failure of the seam to hold until the parts are vulcanized in the case of rubber, or the seam is heat united in the case of thermoplastic material, can be largely overcome by introducing into the rubber or other stock, before the same is formed into a sheet, a small amount of textile flock. I prefer to use from about one-half percent (0.5%) to one and one-half per cent (1.5%) of the total rubber or plastic mix by weight, as this amount will produce the desired result without causing any noticeable change in the properties of the finished article. Up to five per cent (5%) or more of flock may be used but if more than five per cent (5%) is used the finished articles are somewhat stiff and boardy. The presence of this small amount of flock in the unvulcanized rubber sheet or thermoplastic sheet may to some extent increase the strength of the seam, but its primary effect is to reduce the tendency of the sheet to return to its original shape and thereby pull the seam open.

The introduction of a small amount of flock into the rubber stock has another advantage over stock containing no such flock, in that when rubber stock is calendered, there is a distortion of the rubber mass, and after calendering the raw stock tends to retract and change its dimensions. This makes it difficult to control the gauge of the calendered sheet for some operations. The flock decreases this tendency of the sheet stock to change its dimensions, and it is found in practice that the gauge of the rubber sheet is easier to control if the stock contains a small quantity of flock. Likewise the gauge of plasticized thermoplasitc sheet material is easier to control when it contains a small amount of flock.

It will be seen from the foregoing that the difficulty experienced heretofore with the seam tending to part after a cut seaming operation and before the article can be vulcanized, or heated sufficiently to firmly unite the sheets at the seam, can be greatly reduced by simply introducing a small quantity of textile flock in the stock from which the sheets are to be formed.

The flock used may be cotton, wool, or other textile fibers, it should be very fine and sifted, and should resemble flock secured by shearing the nap of cloth.

Examples of plasticized thermoplastic materials which do not require vulcanization are vinylite and polyvinyl butyral. Articles may be formed of these materials by the cut seaming method, but a heat treatment usually follows for the purpose of removing strains and shaping the articles, and this heat treatment may be employed to firmly unite the sheets at the seams.

The term rubber as used in the specification and claims is to be construed broadly as including various synthetic rubber-like materials that may be vulcanized.

Having thus described my invention, what I claim and desire to protect by Letters Patent is:

1. The method of making a seamed article from rubber sheets which comprises, introducing into rubber stock from about .5% to about 1.5% of textile flock and then forming sheets of unvulcanized rubber from such stock, cut-seaming said unvulcanized sheets, and vulcanizing the resulting seamed article whereby this quantity of flock reduces the tendency of the distorted unvulcanized rubber adjacent the cut seam to part the seam before the article is vulcanized but does not noticeably change the propties of the finished article.

2. The method of making a seamed article from sheets of plasticized material which comprises, introducing into plasticized stock from about .5% to about 1.5% of textile flock and then sheeting the stock, cut-seaming such sheets and subjecting the resulting seamed article to heat to firmly unite the sheets at the seam, whereby this quantity of flock reduces the tendency of the distorted pressure-united seam to part prior to said heat action but does not noticeably change the properties of the finished article.

FRANK S. MARTIN.